(12) United States Patent
Hung

(10) Patent No.: US 11,160,636 B2
(45) Date of Patent: Nov. 2, 2021

(54) MASTICATORY ORTHODONTIC DEVICE

(71) Applicant: Cheng-Hsiang Hung, New Taipei (TW)

(72) Inventor: Cheng-Hsiang Hung, New Taipei (TW)

( * ) Notice: Subject to any disclaimer, the term of this patent is extended or adjusted under 35 U.S.C. 154(b) by 0 days.

(21) Appl. No.: 15/898,451

(22) Filed: Feb. 17, 2018

(65) Prior Publication Data
US 2018/0235731 A1  Aug. 23, 2018

Related U.S. Application Data

(60) Provisional application No. 62/461,326, filed on Feb. 21, 2017.

(51) Int. Cl.
*A61C 7/08* (2006.01)
(52) U.S. Cl.
CPC ..................... *A61C 7/08* (2013.01)
(58) Field of Classification Search
CPC ....................................... A61C 7/08
See application file for complete search history.

(56) References Cited

U.S. PATENT DOCUMENTS

| | | |
|---|---|---|
| 8,152,518 B2 | 4/2012 | Kuo |
| 8,944,812 B2 | 2/2015 | Kuo |
| 2010/0086890 A1 | 4/2010 | Kuo |
| 2012/0189971 A1 | 7/2012 | Kuo |
| 2013/0302742 A1* | 11/2013 | Li .............................. A61C 7/08 433/6 |
| 2015/0366637 A1* | 12/2015 | Kopelman ............... A61C 7/08 433/6 |
| 2016/0157962 A1* | 6/2016 | Kim ........................ A61F 5/566 433/6 |

(Continued)

FOREIGN PATENT DOCUMENTS

| | | |
|---|---|---|
| EP | 3087946 A1 | 11/2016 |
| JP | 2009-201916 A | 9/2009 |

(Continued)

OTHER PUBLICATIONS

Japan Patent Office, Office Action, Patent Application No. 2018-024970, dated Mar. 19, 2019, Japan.

(Continued)

*Primary Examiner* — Heidi M Eide
*Assistant Examiner* — Drew S Folgmann

(57) ABSTRACT

A masticatory orthodontic device includes a masticatory unit with a rigid body. The masticatory unit is configured to be removably worn on a dental arch, wherein when worn during mastication, the shape of the masticatory unit is maintained even under a stress from occlusal forces. The masticatory unit includes a teeth-receiving surface with several recesses for accommodating teeth of the dental arch. A shape memory mesh is disposed between the teeth-receiving surface and the dental arch, configured to remember the shape of the teeth in target teeth positions to guide teeth movements from initial teeth positions toward the target teeth positions. A buffering member is disposed between the teeth-receiving surface and the shape memory mesh. Occlusal forces loading on the masticatory unit are transmitted to the shape memory mesh and the teeth through the buffering member, to achieve teeth movements in the recesses.

11 Claims, 10 Drawing Sheets

(56) References Cited

U.S. PATENT DOCUMENTS

2016/0310237 A1    10/2016    Hung

FOREIGN PATENT DOCUMENTS

| JP | 2016-202921 A | 12/2016 |
| TW | 201637625 A | 11/2016 |
| WO | WO 2014/044720 A1 | 3/2014 |
| WO | WO 2017/070260 A1 | 4/2017 |

OTHER PUBLICATIONS

Korea Patent Office, Office Action, Patent Application No. 10-2018-0019971, dated Apr. 29, 2019, Korea.

European Patent Office, Office Action, Patent Application Serial No. 18156769.4, dated Jun. 21, 2018, Europe.

* cited by examiner

MASTICATORY ORTHODONTIC DEVICE

CROSS REFERENCE TO RELATED APPLICATIONS

The present application claims priority of U.S. Provisional Patent Application No. 62/461,326, filed on Feb. 21, 2017, the entirety of which is incorporated by reference herein.

BACKGROUND OF THE INVENTION

Field of the Invention

The present application relates to an orthodontic technology; and in particular to a removable masticatory orthodontic device.

Description of the Related Art

Misaligned teeth can adversely affect a person's dental aesthetics, functions, and health. The goal of orthodontic correction is to bring the teeth into proper alignment by using appliances which exert mechanical forces to move the teeth to positions or orientations where the dental functions and aesthetics are improved.

Conventional braces use an archwire as the force-inducing appliance. The archwire is pre-shaped and interconnects the teeth through brackets that are fixed to the teeth. When initially installed, the archwire elastically deforms to accommodate the teeth in malposition to exert resilient corrective forces on them. The archwire exerts continuous forces on the teeth to gradually urge them to their finish positions. Making use of the appliance's own resilient property is also the working principle with aligners. The body or shell of clear aligners used in prior art is flexible and deforms when the appliance is worn, providing resilient corrective force as it tries to return to its original shape. When a clear aligner is worn on misaligned teeth, it is elastic and tries to accommodate the misaligned teeth, but does not fully contact the surfaces of the teeth. Thus, additional parts fixed to the teeth, such as attachments are needed to allow the aligner body to better engage the misaligned teeth to apply resilient force. Clear aligners are required to be worn over 20 hours per day (except when the patient is eating) in order to provide continuous corrective force to achieve orthodontic results.

Clear aligners have the advantage of being less visible and removable. A patient removable appliance promotes better oral hygiene as the patient can more easily clean the teeth and the appliance. However, using clear aligners with attachments fixed on misaligned teeth can be more painful for patients. It is recognized in orthodontic practice that light, intermittent forces are preferable to heavy, continuous forces in making the teeth move faster through the alveolar bone and reduce risks of root resorption.

BRIEF SUMMARY OF THE INVENTION

In view of the aforementioned problems, an object of the invention is to provide a novel orthodontic device which relies on intermittent short-duration occlusal forces generated during mastication for the orthodontic correction force (hereinafter referred to as a "masticatory orthodontic device"), thereby reducing the time and discomfort of wearing the device while accelerating orthodontic tooth movement. In particular, the dental appliance used in the masticatory orthodontic device includes a rigid shell that is not deformed even under loading from occlusal forces, and the dental appliance is a patient removable appliance. A shape memory mesh is further disposed in the dental appliance to exert weak guiding forces on the misaligned teeth (to direct the movement of those teeth to the target teeth positions), but not sufficient to move them (without occlusal forces).

Embodiments of the invention provide a masticatory orthodontic device, including at least one masticatory unit with a rigid body. The masticatory unit is configured to be removably worn on a dental arch, wherein when worn during mastication, the shape of the masticatory unit is maintained even under a stress from occlusal forces. The masticatory unit includes an occlusal surface and a teeth-receiving surface with a plurality of recesses for accommodating the teeth of the dental arch. A shape memory mesh is disposed between the teeth-receiving surface and the dental arch, configured to remember a shape of the teeth in target teeth positions to guide teeth movements from initial teeth positions toward the target teeth positions. A buffering member is disposed between the teeth-receiving surface and the shape memory mesh. When the masticatory orthodontic device is worn during mastication, occlusal forces loading on the masticatory unit are transmitted to the shape memory mesh and the teeth through the buffering member that is resilient, to achieve teeth movements in the recesses.

In some embodiments, the shape memory mesh includes a first section and a second section. The structural configuration of the first section is different from the structural configuration of the second section.

In some embodiments, the size of opening in the first section and the second section is different. In some embodiments, the shape of opening in the first section and the second section is different. In some embodiments, the width of lines in the first section and the second section is different.

In some embodiments, the shape memory mesh covers parts of the undercuts of the teeth to provide retention on the teeth.

In some embodiments, the buffering member is disposed between and connected to the teeth-receiving surface and the outer surface of the shape memory mesh and conforms to the shape of the outer surface.

In some embodiments, the shape memory mesh and the buffering member extend along the entire teeth-receiving surface.

In some embodiments, the teeth-receiving surface is configured to allow the transition of the teeth from the initial teeth positions to the target teeth positions.

In some embodiments, the masticatory unit further includes cusps and fossae features formed on the occlusal surface.

In some embodiments, the masticatory unit further includes canine protection features on buccal surfaces of the masticatory unit, and the canine protection features each have a guiding surface on its lingual side.

Embodiments of the invention also provide a shape memory mesh configured to guide teeth movement from initial teeth positions toward target teeth positions. The shape memory mesh has a remembered shape to conform to the target teeth positions and includes at least two different sections. Each of the sections is designed to provide a different guiding force, and the guiding forces are determined by the size of openings and/or the width of wire portions of the shape memory mesh.

Embodiments of the invention also provide a masticatory orthodontic method, including installing a masticatory orthodontic device as described above on a dental arch of a patient. The masticatory orthodontic method further includes moving one or more teeth of the dental arch by occlusal forces loading on the masticatory unit and transmitted to the teeth. In addition, the masticatory orthodontic method includes guiding the movement of the teeth to the target teeth positions by the shape memory mesh.

In some embodiments, the masticatory orthodontic method also includes transmitting and buffering occlusal forces from the masticatory unit to the shape memory mesh and the teeth by the buffering member.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
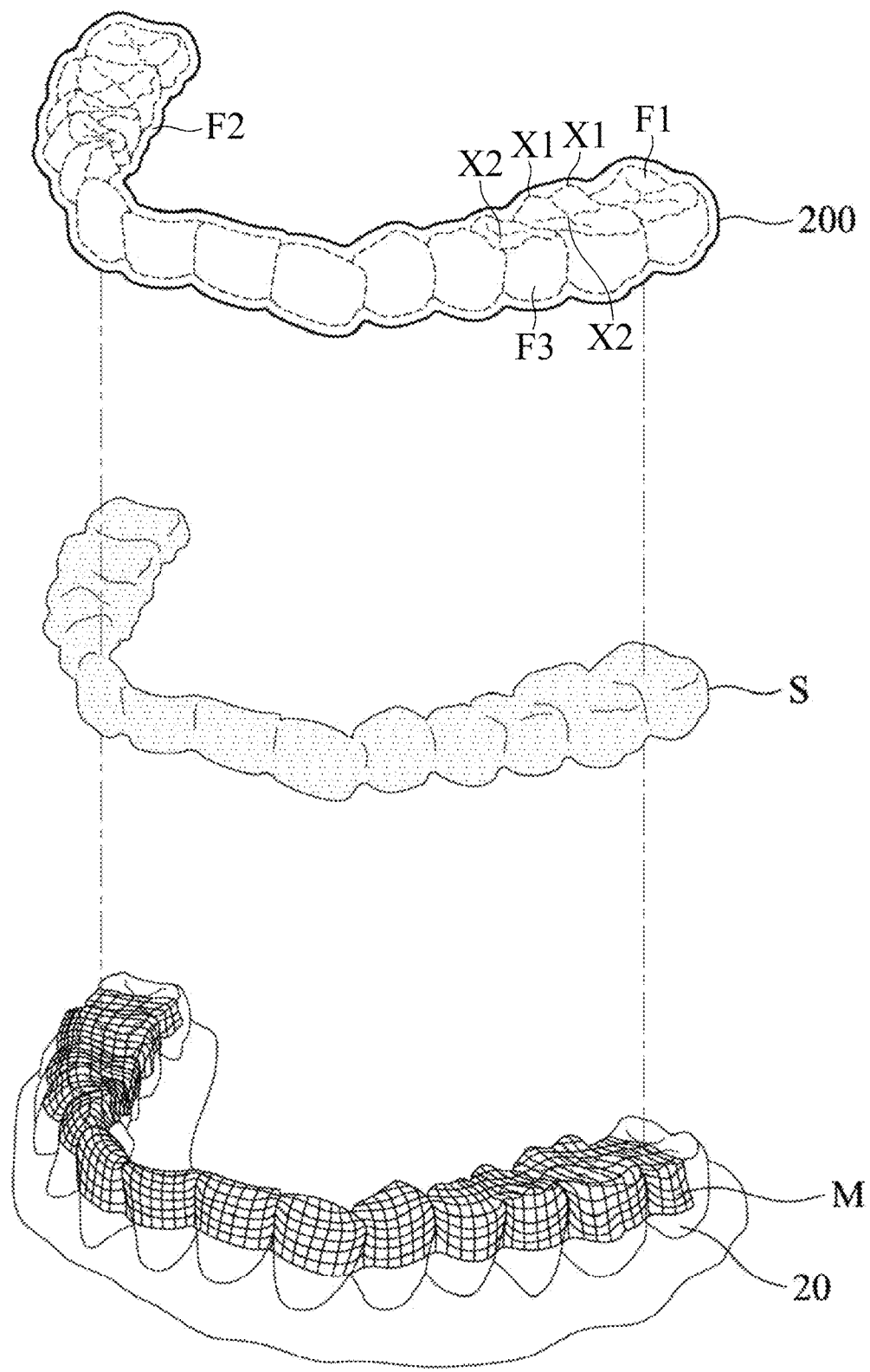
FIG. 1 is a schematic view illustrating the parts of a masticatory orthodontic device worn on a dental arch, according to some embodiments of the invention.

In order to illustrate the purposes, features, and advantages of the invention, the preferred embodiments and drawings of the invention are shown in detail as follows.

In the following detailed description, the orientations of "on", "above", "under", "below", "left", and "right" are used for representing the relationship between the relative positions of each element as illustrated in the drawings, and are not meant to limit the invention.

Moreover, although the terms first, second, third, fourth etc. may be used in the following detailed description to describe various elements, regions or sections, these elements, regions or sections should not be limited by these terms. These terms are only used to distinguish one element, region or section from another element, region or section. Thus, a first element, region or section discussed below could be termed a second element, region or section without departing from the teachings of the present invention.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity.

FIG. 1 is a schematic view illustrating the parts of a masticatory orthodontic device worn on a dental arch, according to some embodiments of the invention. As shown in FIG. 1, the masticatory orthodontic device includes a masticatory unit 200 with a rigid body (which will be further illustrated below), a shape memory mesh M, and a buffering member S. In FIG. 1, the three parts of the masticatory orthodontic device are separated for clarity, but should be understood as parts of a single device to be removably worn on a dental arch (such as the mandibular dental arch 20) of a patient (without an opposing masticatory unit on the other dental arch). In some other embodiments, the masticatory orthodontic device (including a masticatory unit, a shape memory mesh, and a buffering member) may also be removably worn the maxillary dental arch of a patient. Alternatively, the masticatory orthodontic device may include two masticatory units 100 and 200 (FIG. 2) each with a shape memory mesh and a buffering member therein, and the masticatory units may be removably worn on the maxillary and mandibular dental arch of a patient, respectively. Being patient removable, the masticatory orthodontic device is to be worn during mastication, occurring in daily activities such as eating food and chewing gum.

The masticatory units 100 and 200 are configured to be removably worn on the maxillary and mandibular dental arch and each include an outer surface and an inner surface. In FIG. 1, the outer surface of the masticatory unit 200 includes an occlusal surface F1, a lingual surface F2, and a labial-buccal surface F3, and the inner surface (i.e., the teeth-receiving surface (cannot be seen in FIG. 1 due to limited viewing angle)) includes several recesses R (FIG. 3) for accommodating teeth of the maxillary or mandibular dental arch when the masticatory orthodontic device is worn.

It should be appreciated that when a patient wears the masticatory orthodontic device described above, loading on the teeth from the occlusion of the maxillary and mandibular dental arches during mastication is a driving force that enables the masticatory orthodontic device to function as an orthodontic device (which will be further illustrated later). In particular, the rigid shells of the masticatory units 100 and 200 do not deform or apply resilient force against teeth, and their shape is maintained without deformation when accommodating the misaligned teeth even under loading or a stress from occlusal forces. This is in contrast with the case of clear aligners used in prior art, wherein the body or shell of the clear aligner is flexible and deforms when worn on teeth in malposition, using the resilient force of the aligner body or shell as the orthodontic force. In some embodiments, the masticatory unit 100 and 200 are occlusal splints made of orthodontic resin or other materials suitable for use in oral applications.

Figure 2:
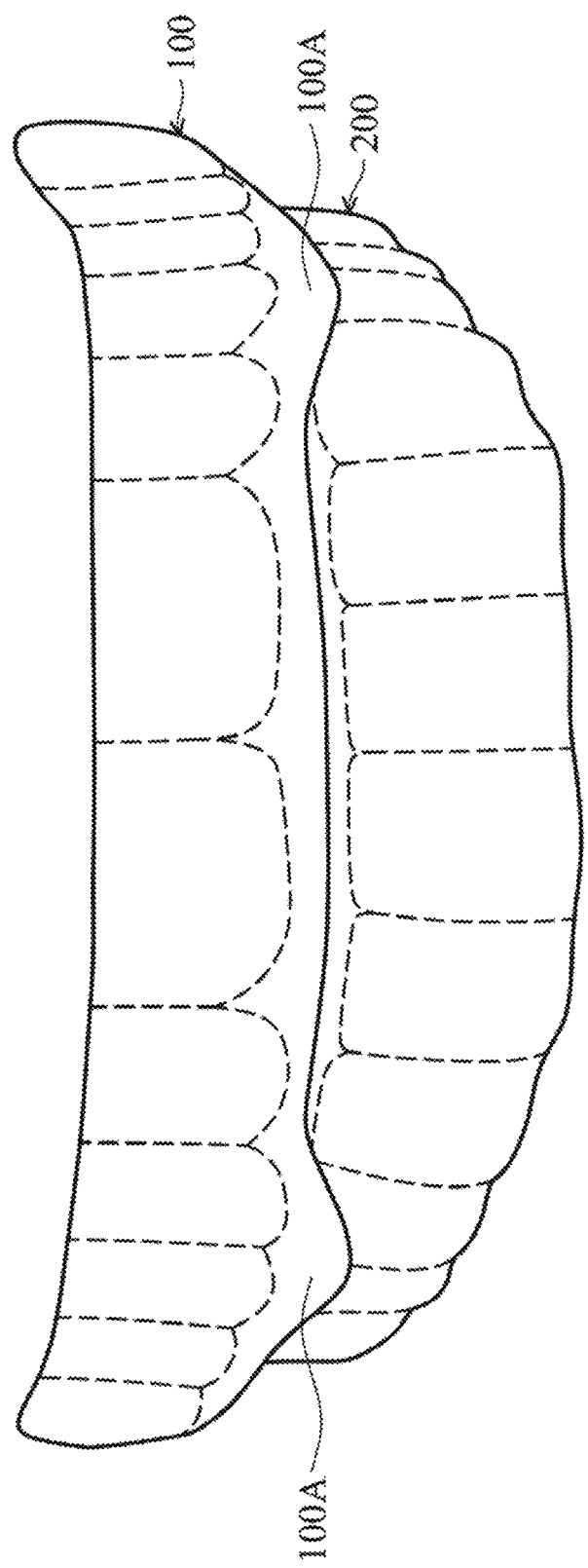
FIG. 2 is a schematic view illustrating two opposing masticatory units in occlusion, according to some embodiments.

Features of the masticatory units 100 and 200 are further illustrated below. FIG. 2 is a schematic view illustrating two opposing masticatory units in occlusion, according to some embodiments. As shown in FIG. 2, the masticatory orthodontic device includes a masticatory unit 100 for the maxillary dental arch and a masticatory unit 200 for the mandibular dental arch. The (maxillary) masticatory unit 100 has two limit parts 100A (also referred as "canine protection features") formed on the left and right buccal parts (i.e., the buccal surfaces) of the outer surface and corresponding to the upper canines (not shown) of the maxillary dental arch. Each limit parts 100A has a guiding surface (cannot be seen in FIG. 2 due to limited viewing angle)) on its lingual side for guiding and limiting the horizontal movement of the (mandibular) masticatory unit 200 during mastication.

Figure 3:
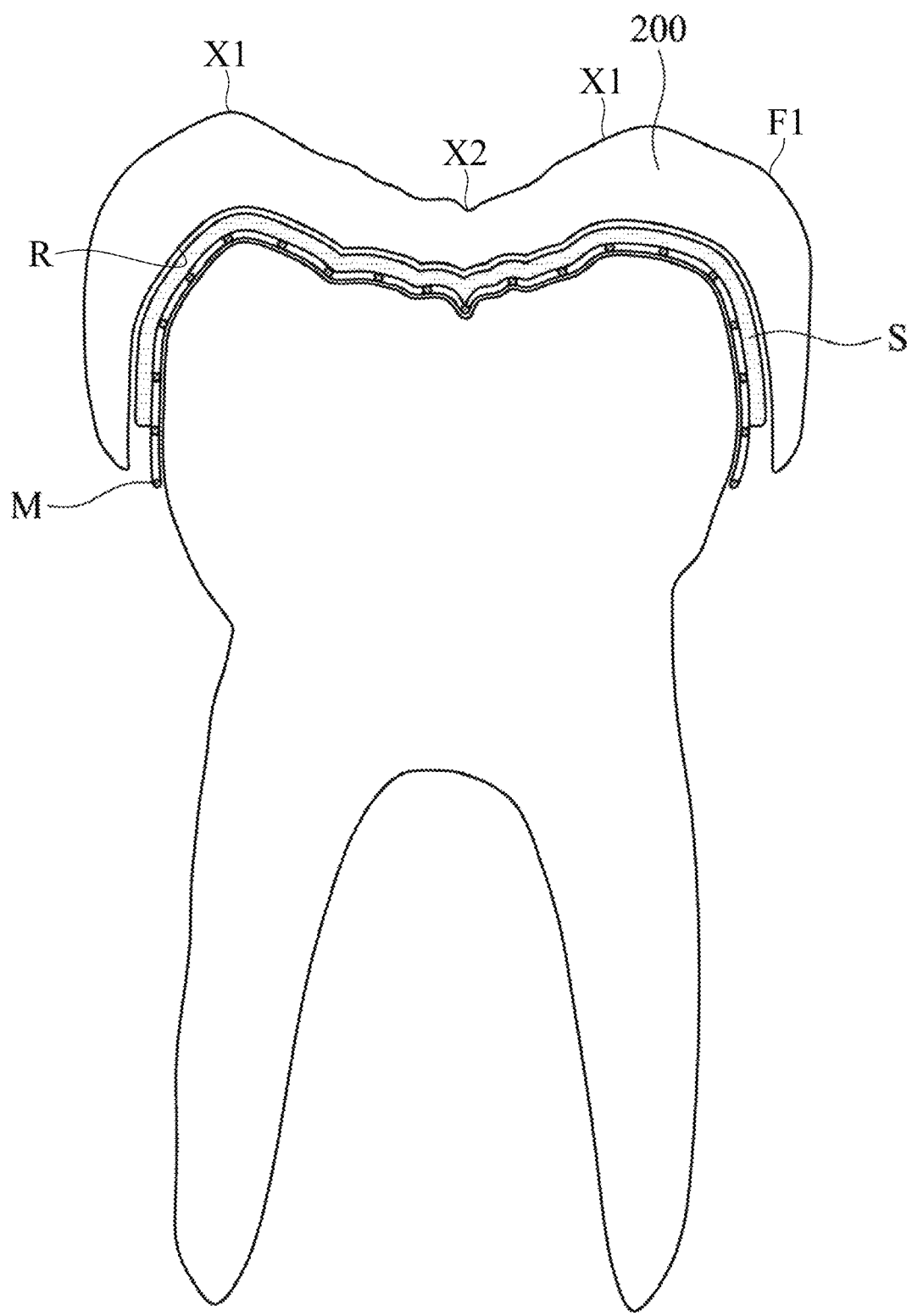
FIG. 3 is a schematic cross-sectional view of how a masticatory unit, a shape memory mesh, and a buffering member are placed in relation to a tooth, according to some embodiments.

In some embodiments, the occlusal surface F1 of the masticatory unit 100 or 200 has a shape for establishing functional occlusion with the opposing masticatory unit 200 or 100 worn on the other dental arch (or with the other dental arch without an opposing masticatory unit), so that the opposing occlusal surfaces contact with efficiency and without producing trauma during mastication. As shown in FIGS. 1 and 3, cusps feature X1 and fossae features X2 are formed on the occlusal surface F1 of the masticatory unit 200 (or 100), and in a preferred embodiment, all the fossae features X2 are distributed in a curve (e.g. a parabola). In addition, when the two masticatory units 100 and 200 make contact, the cusps features X1 of one masticatory unit contact the fossae features X2 of the other masticatory unit, and vice versa.

Accordingly, when a patient wears the masticatory units 100 and 200 to masticate, the occlusal points of the masticatory units 100 and 200 (i.e. the cusps and fossae features X1 and X2) preferably contact each other simultaneously and separate from each other simultaneously. Also, occlusion occurs with the maximum effective contact area without slipping or other damaging movements, and pressure is more evenly distributed. Consequently, the effectiveness of correction and comfort of the patient wearing the masticatory units 100 and 200 are improved.

FIG. 3 is a schematic cross-sectional view of how a masticatory unit, a shape memory mesh, and a buffering member are placed in relation to a tooth, according to some embodiments. As shown in FIG. 3, the inner surface of a masticatory unit 200 (or 100) has a shape which provides a space (not shown) between the inner surface of the masticatory unit 200 (or 100) and the outer surface of the shape memory mesh M. The buffering member S is placed in the space between the inner surface of the masticatory unit 200 (or 100) and the outer surface of the shape memory mesh M.

It should be appreciated that when masticating, occlusal forces loading on the masticatory unit 200 (or 100) are transmitted to the shape memory mesh M and teeth through the buffering member S. In some embodiments, the buffering member S is elastic and deforms to conform to the shape of the outer surface of the shape memory mesh M when compressed. The buffering member S may be made of a silicone-based soft denture relining material or the like.

Referring to FIG. 1, the shape memory mesh M covers most of the surface of the dental arch (such as the mandibular dental arch 20), leaving the latter halves of the second molars exposed, in some embodiments. Further, the shape memory mesh M stretches over the boundaries between teeth. In some embodiments, the shape memory mesh M is disposed between the teeth-receiving surface and the dental arch. The buffering member S is disposed between and connected to the teeth-receiving surface (i.e. the recesses R) of the masticatory unit 200 (or 100) and the shape memory mesh M by adhesion, for example. In some embodiments, the shape memory mesh M and the buffering member S extend along the entire teeth-receiving surface (i.e., all of the recesses R) of the masticatory unit 200 (or 100).

In some embodiments, the shape memory mesh M has a remembered shape which contacts or accommodates one or more teeth of the dental arch with the teeth in the target teeth positions. In some embodiments, the shape memory mesh M is formed of at least one thin layer or flat sheet of a shape memory material, such as a shape memory alloy (e.g., nickel titanium (Ni—Ti) alloy) or a shape memory polymer (SMP).

In some embodiments, the remembered shape of the shape memory mesh M is formed by pressing and heat treating the thermal-responsive shape memory material with a (teeth) mold corresponding to a dental arch with the teeth in the target teeth positions. Once the remembered shape is formed, the inner surface of the shape memory mesh M is shaped to contact one or more teeth of the dental arch in the target teeth positions.

In some embodiments, the shape memory mesh M is heat-activated. Referring to FIG. 1, when worn on the dental arch at room temperature, the shape memory mesh M is elastic and can be stretched to accommodate the misaligned teeth. Accordingly, the shape of the inner surface of the shape memory mesh M conforms to the surfaces of the teeth it receives. In some embodiments, the shape memory mesh M covers most of the crown of the teeth, including parts of the undercuts of the teeth to provide retention on the teeth.

In some embodiments, the shape memory mesh M can be worn on the dental arch first, followed by the masticatory unit 200 (or 100) with a buffering member S therebetween. In other embodiments, the shape memory mesh M, the masticatory unit 200 (or 100), and the buffering member S therebetween are provided as a single device and is worn on the dental arch as a single device.

As the temperature rises due to body heat, the shape memory mesh M tries to return to its remembered shape, exerting weak guiding forces on the misaligned teeth, but not sufficient to move them. The occlusal forces loading on the masticatory unit 200 (and/or the masticatory unit 100) are transmitted to the shape memory mesh M and the misaligned teeth (including the root, the periodontal tissue, and the surrounding alveolar bone) through the buffering member S, so that the misaligned teeth moves (with respect to the surrounding alveolar bone) in the corresponding recesses R of the masticatory unit. As the movement of the misaligned teeth is driven by occlusal forces, the shape memory mesh M provides the weak guiding forces to direct the movement of the teeth to the target teeth positions.

Figure 4A:
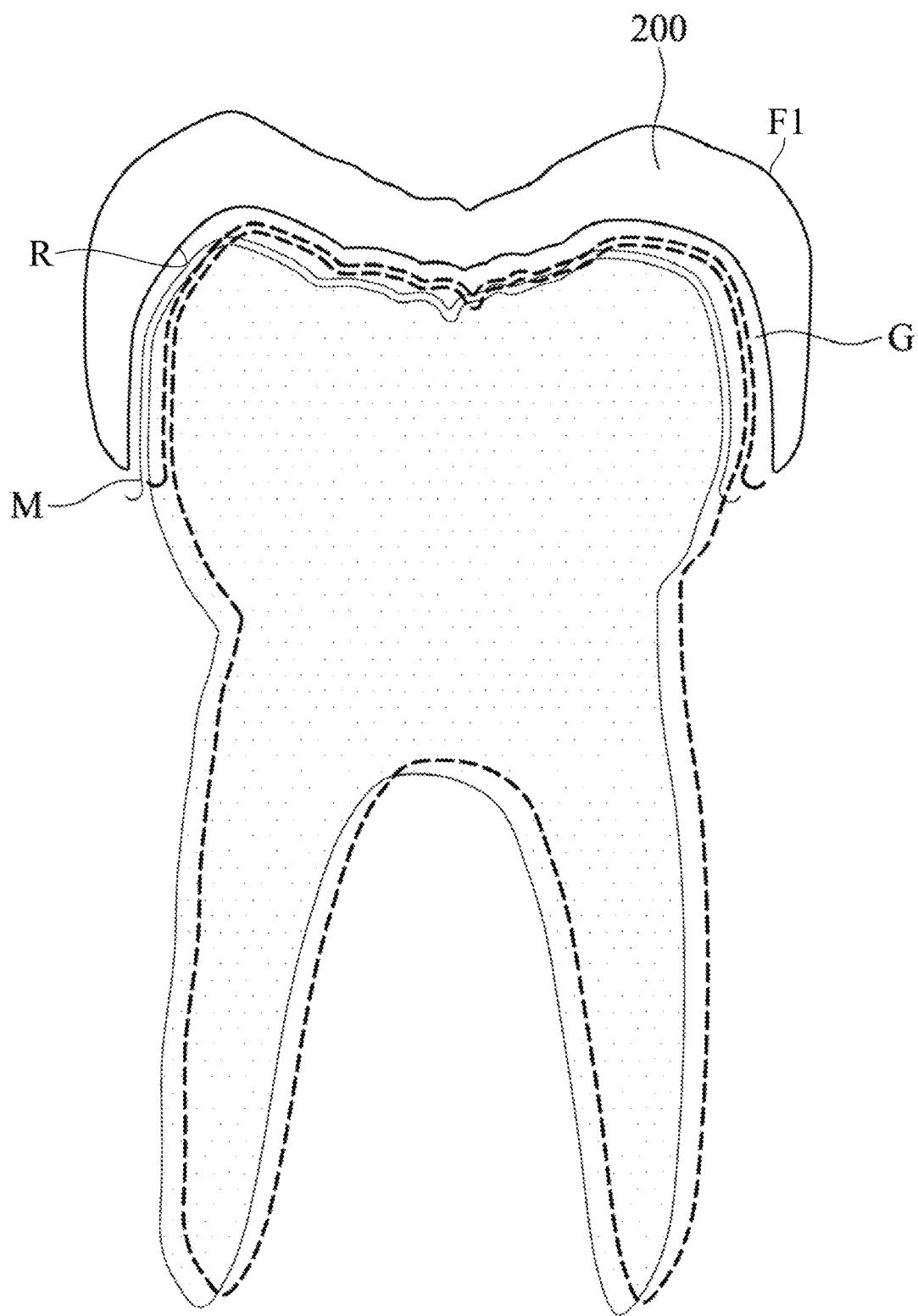
FIG. 4A is a schematic cross-sectional view illustrating that the space formed by the inner surface of a masticatory unit allows a shape memory mesh and a tooth to complete a range of movement.
Figure 4B:
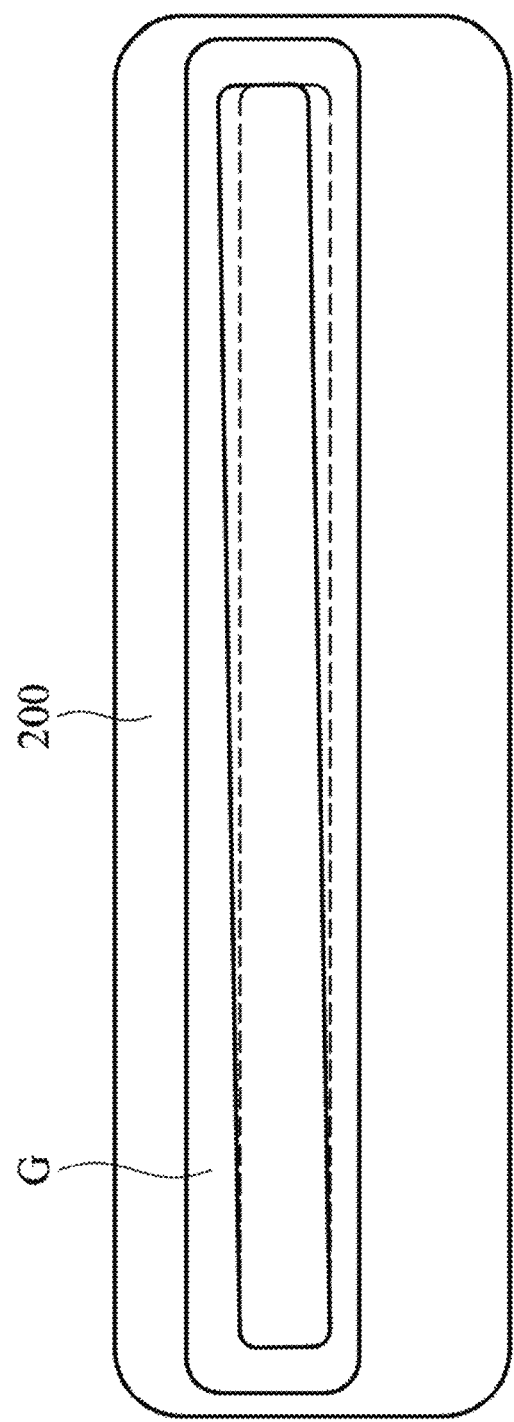
FIG. 4B is a schematic top-down view illustrating that the space formed by the inner surface of a masticatory unit allows a shape memory mesh and a tooth to complete a range of movement.

FIG. 4A is a schematic cross-sectional view illustrating that the space G formed by the inner surface of a masticatory unit 200 allows a shape memory mesh M and a tooth to complete a range of movement. In FIG. 4A, solid lines indicate an initial (misaligned) position of a tooth (e.g., a premolar or other tooth) and a shape memory mesh M, and dashed lines indicate a target position of the tooth and the shape memory mesh M (i.e. its remembered shape). At room temperature, the shape memory mesh M easily stretches to accommodate the initial position of the tooth. The shape of the inner surface of a masticatory unit 200 provides a space G (between the inner surface of the masticatory unit 200 and the outer surface of the shape memory mesh M) which is sufficient to allow the shape memory mesh M and the tooth to complete a certain range of movement to the target position. FIG. 4B is a schematic top-down view illustrating that the space G formed by the inner surface of a masticatory unit 200 allows a shape memory mesh M and a tooth (e.g., an incisor) to complete a certain range of movement from the initial position (solid line) to the target position (dashed line). Note that the buffering member S provided in the space G is not depicted in FIGS. 4A-4B for the purpose of simplicity and clarity.

In some embodiments, the completion of a range of teeth movement to the desired final teeth positions may require several shape memory meshes M having different remembered shapes disposed in the same single masticatory unit 200 (or 100), wherein the remembered shape of each shape memory mesh M corresponds to predetermined target teeth positions of the teeth depending on the actual requirement. In some other embodiments, the completion of a range of teeth movement to the desired final teeth positions may require only a single shape memory mesh M disposed in the same single masticatory unit 200 (or 100).

Figure 5A:
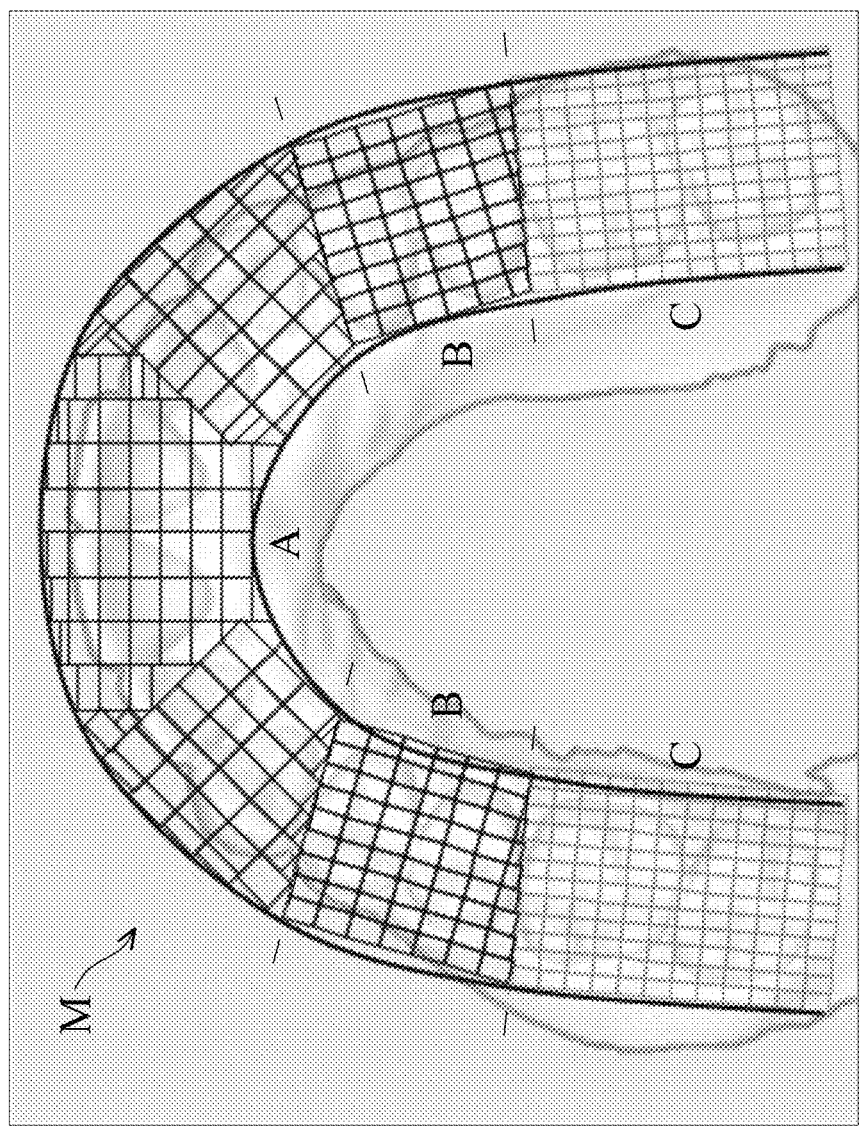
FIG. 5A-5D is a schematic view illustrating various structural configurations of a shape memory mesh (before being pressed over a teeth mold), according to some embodiments.

FIG. 5A-5D is a schematic view illustrating various structural configurations of a shape memory mesh M (before being pressed over a teeth mold), according to some embodiments. Referring to FIG. 5A, which shows an embodiment of a shape memory mesh M for providing weak guiding forces to direct teeth movement toward final teeth positions, consisting of three different sections, each corresponding to a different section of the patient's dental arch. In this case, section A corresponds to the anterior teeth (incisors and canine), section B corresponds to the premolars, and section C corresponds to the molars. The purpose for the different sections is to separately provide the appropriate guiding force that each type of tooth can support. For example, the weak guiding force exerted on the molars can be greater than that exerted on premolars, and the weak guiding force exerted on the premolars can be greater than that exerted on the incisors, all weak guiding forces not sufficient to move teeth.

In some embodiments, the shape memory mesh M is perforated, and the size and/or shape of its openings of its wire portions can be changed to produce different weak guiding forces. For example, where the openings are larger, the produced weak guiding forces are lighter. In FIG. 5A, the openings in section B of the shape memory mesh M are larger than the openings in section C. In some embodiments, the shape of the openings in different sections of the shape memory mesh M is different, such as square, rectangular, triangular, rhombic, and/or other polygonal shapes.

Figure 5B:
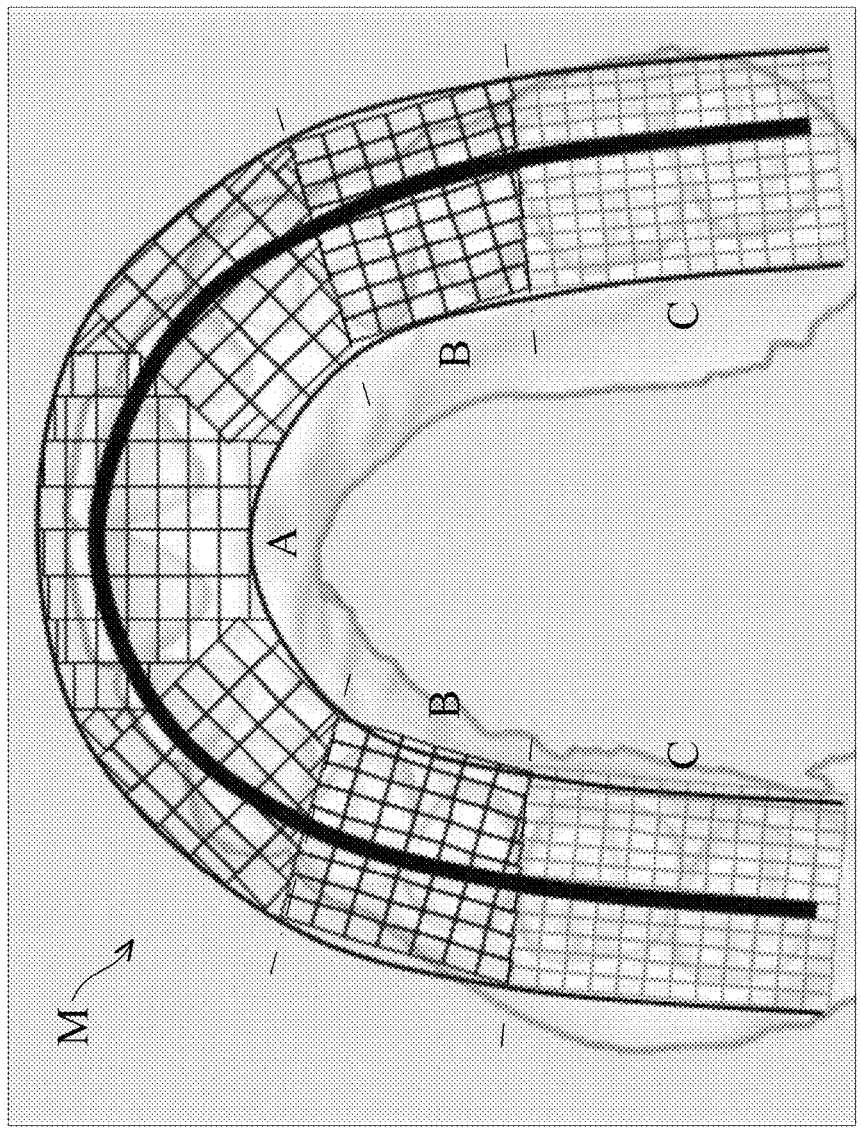
Figure 5C:
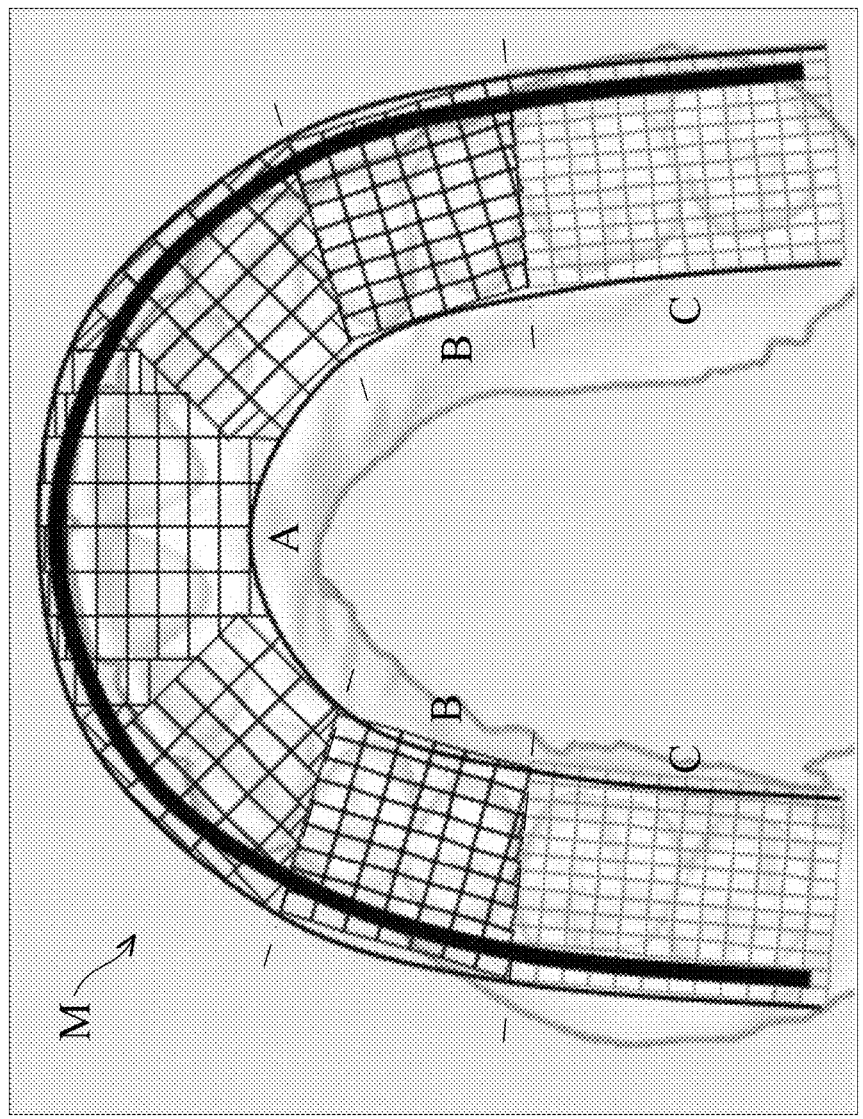
Figure 5D:
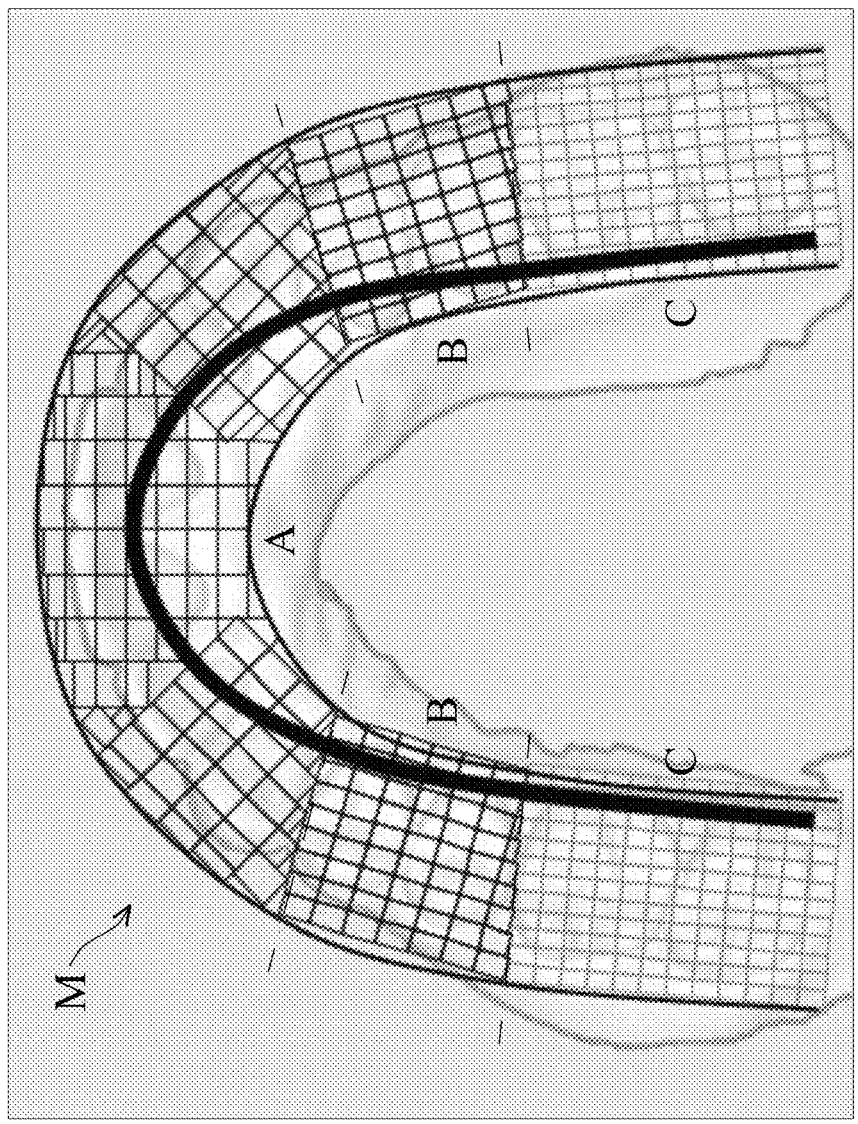

FIG. 5B shows another embodiment of a shape memory mesh M for guiding teeth movement toward the final teeth positions, consisting of three different sections, each corresponding to a different section of the patient's dental arch and providing a different guiding force to that section. In addition, the structure of shape memory mesh M includes a thickened wire portion that is shaped as an arch, positioned along the occlusal part of the shape memory mesh M and extending throughout the full dental arch. The occlusal part of the shape memory mesh M corresponds to the occlusal surface F1 (FIG. 1) of the dental arch. FIG. 5C illustrates the case in which the thickened wire portion is positioned along the labial-buccal part of the shape memory mesh M corresponding to the labial-buccal surface F3 (FIG. 1) of the dental arch, and shaped as an arch extending throughout the full dental arch. FIG. 5D shows the case in which the thickened wire portion is positioned along the lingual part of the shape memory mesh M corresponding to the lingual surface F2 (FIG. 1) of the dental arch. Such a thickened wire portion reinforces the structure of the shape memory mesh M and increases the guiding forces for guiding teeth to align along a final dental arch shape. In some embodiments, the width of the wire portions in different sections of the shape memory mesh M is different to produce different weak guiding forces.

In some embodiments, the shape memory mesh M provides weak guiding forces which are not sufficient to move teeth. Numerical values of optimum forces for orthodontic tooth movement are available from the research literature. For example, a force of 10 to 20 g/cm2 is needed for intrusion, and a force of 70 to 100 g/cm2 is desired for translation. Optimum force level for tooth movement varies in the range of 9 to 100 g/cm2, capable of achieving maximum tooth movement without tissue damage and minimum patient discomfort. It is reasonable to prescribe the shape memory mesh characteristics to be below these range values. However, the optimal force for tooth movement may differ for each tooth and for each patient, also depending on the current condition of the patient. For example, a patient with gingivitis or other dental problems may require even lower force values. In some cases, it is appropriate to select the exerted weak force level to be below the pain threshold felt by the patient.

Figure 6:
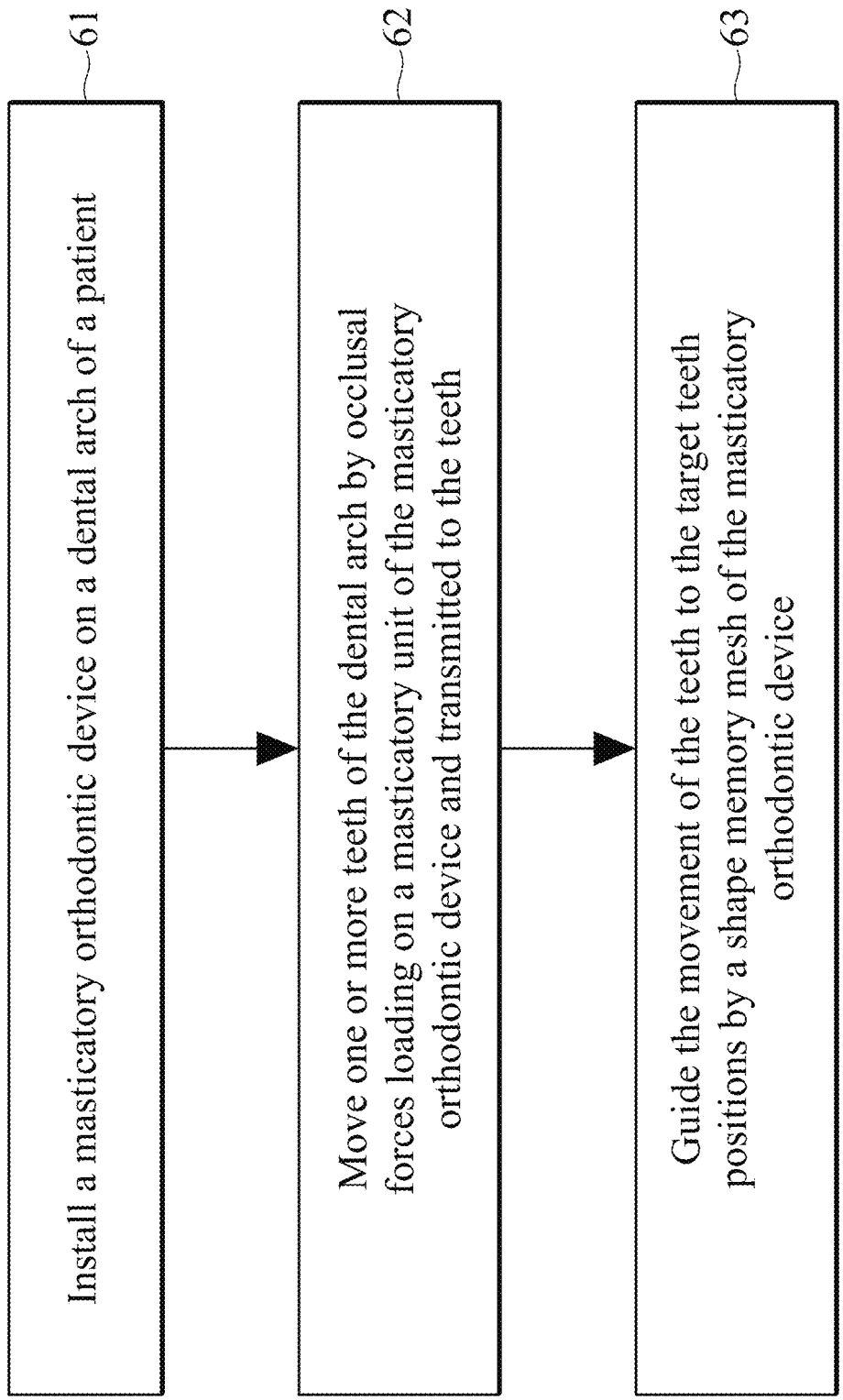
FIG. 6 is a simplified flow chart of a masticatory orthodontic method, according to some embodiments.

Embodiments of a masticatory orthodontic method are also provided. FIG. 6 is a simplified flow chart of a masticatory orthodontic method, according to some embodiments. For illustration, the flow chart will be described along with the drawings shown in FIGS. 1-3 and 4A-4B. Some of the described operations can be replaced or eliminated in different embodiments. Alternatively, some operations may be added in different embodiments. The masticatory orthodontic method includes a number of operations, such as operations 61, 62, and 63.

In operation 61, a masticatory orthodontic device (such as the masticatory orthodontic device shown in FIGS. 1-2) as described above is installed or worn on at least one of the maxillary and mandibular dental arch of a patient. In some embodiments, the masticatory orthodontic device includes a masticatory unit 100 or 200 with a rigid body, a shape memory mesh M, and a buffering member S therebetween. In some embodiments, the three parts (i.e., the masticatory unit 100 or 200, the shape memory mesh M, and the buffering member S) are provided as a single device and is worn on the dental arch as a single device. Alternatively, the shape memory mesh M can be worn on the dental arch first, followed by the masticatory unit 100 or 200 with a buffering member S therebetween, wherein the shape memory mesh M can be adhered to or separated from the buffering member S fixed to the masticatory unit 100 or 200.

In operation 62, one or more teeth of the maxillary or mandibular dental arch are moved by occlusal forces loading on the masticatory unit 100 or 200 and transmitted to the teeth. It should be appreciated that when a patient wears the masticatory orthodontic device to masticate, occlusal forces loading on the masticatory unit 100 or 200 are transmitted to the shape memory mesh M and the teeth through the buffering member S, thereby moving the teeth. The buffering member S is configured to transmit and buffer occlusal forces from the masticatory unit 100 or 200 to the shape memory mesh M and the teeth. It should be noted that a patient can wear the masticatory orthodontic device to masticate for short durations (e.g. about a half hour for each meal) and achieve sufficient orthodontic tooth movement. In contrast, conventional braces are worn all the time, and clear aligners or aligners with metallic portions must be worn for more than 20 hours per day.

In operation 63, the movement of the teeth is guided by the shape memory mesh M to the target or final teeth positions. It should be appreciated that as the movement of the misaligned teeth is driven by occlusal forces, the shape memory mesh M provides weak guiding forces to direct the movement of the teeth to the target or final teeth positions.

The embodiments of the present disclosure have some advantageous features: Mastication provides the occlusal forces which are exerted intermittently and physiologically on the masticatory unit and transmitted to the shape memory mesh and teeth through the buffering member, so that the misaligned teeth move with respect to the surrounding alveolar bone. Furthermore, the shape memory mesh does not produce the force necessary for tooth movement but provides weak guiding forces to direct the movement of the teeth to the target or final teeth positions. Consequently, the time and discomfort of wearing the orthodontic device can be reduced while the orthodontic tooth movement can be accelerated.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A masticatory orthodontic device, comprising:
a masticatory unit being a rigid body configured to be removably worn on a dental arch, wherein the rigid body does not apply a resilient force against teeth of the dental arch, and a shape of the masticatory unit is maintained without deformation when accommodating misaligned teeth of the dental arch even under a stress from occlusal forces, and the masticatory unit includes an occlusal surface and a teeth-receiving surface with a plurality of recesses for accommodating the teeth of the dental arch, wherein a shape of the teeth-receiving surface is configured to allow the teeth to transition from initial teeth positions to target teeth positions in the recesses;
a shape memory mesh, disposed such that it is between the teeth-receiving surface and the dental arch when the masticatory unit is worn on the dental arch, configured to remember a shape of the teeth in the target teeth positions and to guide movement of force on the misaligned teeth to the target teeth positions when tooth movement is driven by occlusal forces; and
a buffering member disposed between and connected to the teeth-receiving surface and an outer surface of the shape memory mesh and conforming to the shape of the outer surface, wherein when the masticatory orthodontic device is worn during mastication, occlusal forces loading on the masticatory unit are transmitted to the shape memory mesh and the teeth through the buffering member that is resilient, to achieve teeth movements in the recesses.

2. The masticatory orthodontic device as claimed in claim 1, wherein the shape memory mesh includes a first section and a second section, and the structural configuration of the first section is different from the structural configuration of the second section.

3. The masticatory orthodontic device as claimed in claim 2, wherein the size of openings in the first section and the second section is different.

4. The masticatory orthodontic device as claimed in claim 2, wherein the shape of openings in the first section and the second section is different.

5. The masticatory orthodontic device as claimed in claim 2, wherein the width of wire portions in the first section and the second section is different.

6. The masticatory orthodontic device as claimed in claim 1, wherein the shape memory mesh is configured to cover parts of undercuts of the teeth to provide retention on the teeth when the masticatory unit is worn on the dental arch.

7. The masticatory orthodontic device as claimed in claim 1, wherein the shape memory mesh and the buffering member extend along the entire teeth-receiving surface.

8. The masticatory orthodontic device as claimed in claim 1, wherein the masticatory unit further includes cusps and fossae features formed on the occlusal surface.

9. The masticatory orthodontic device as claimed in claim 1, wherein the masticatory unit further includes limit parts formed on buccal surfaces of the masticatory unit, and the limit parts each have a guiding surface on its lingual side configured to contact a second masticatory unit worn on an opposing dental arch for guiding and limiting a horizontal movement of the second masticatory unit during mastication.

10. A masticatory orthodontic method, comprising:
installing a masticatory orthodontic device as claimed in claim 1 on a dental arch of a patient;
moving one or more teeth of the dental arch by occlusal forces that are loading on the masticatory unit and transmitted to the teeth; and
guiding the movement of the teeth to target teeth positions by the shape memory mesh.

11. The masticatory orthodontic method as claimed in claim 10, further comprising:
transmitting and buffering occlusal forces from the masticatory unit to the shape memory mesh and the teeth by the buffering member.

* * * * *